Jan. 27, 1942.  L. DE MOSS  2,270,857
CARCASS SPREADER
Filed May 27, 1939
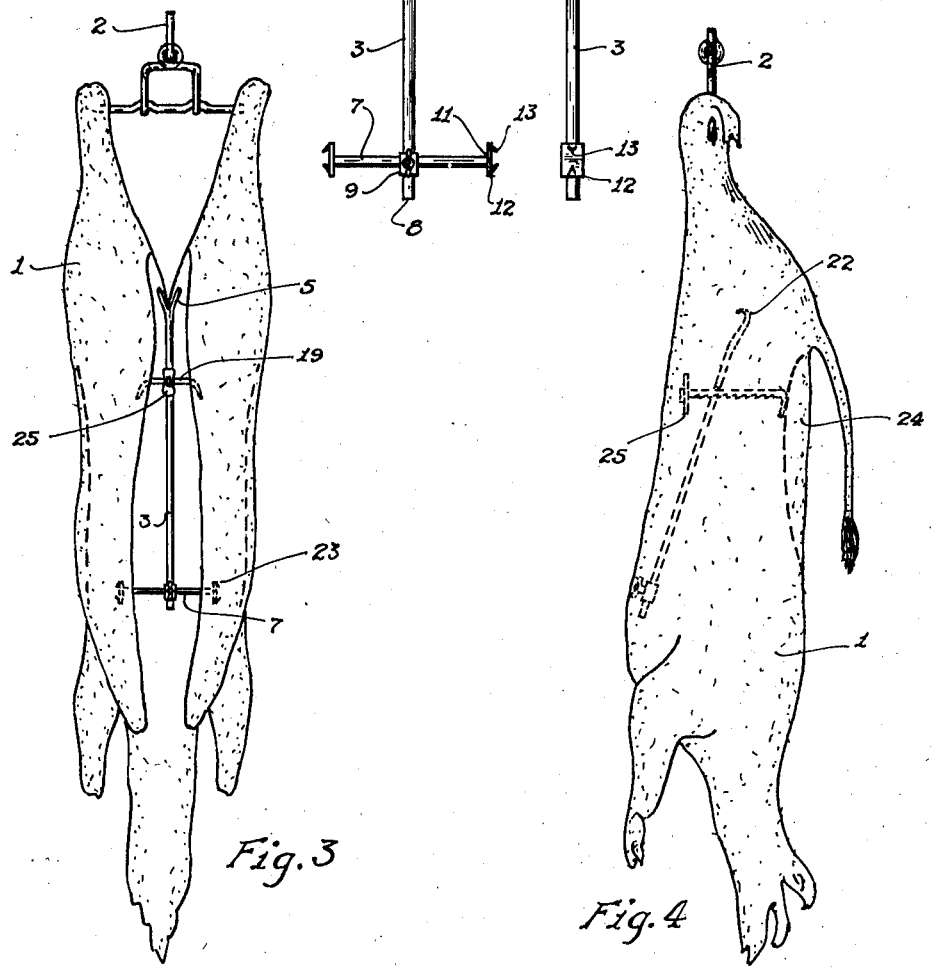
Leonard De Moss
INVENTOR
ATTORNEY Patented Jan. 27, 1942

2,270,857

UNITED STATES PATENT OFFICE 2,270,857

CARCASS SPREADER

Leonard De Moss, Des Moines, Iowa, assignor to Industrial Patents Corporation, Chicago, Ill., a corporation of Delaware Application May 27, 1939, Serial No. 276,060

6 Claims. (Cl. 17—44)

This invention relates to a carcass treatment means.

One of the objects of the invention is to provide an improved carcass treatment means.

Another object of the invention is to provide means adaptable to whole animal carcasses to prevent muscular distortion of the animal carcasses.

Another object of the invention is to provide means for spreading in relatively opposite directions, the back and briskets of freshly killed animal carcasses to prevent muscular distortion of the carcasses during chilling thereof.

Other objects of the invention will be apparent from the description and claims which follow.

In accordance with the present invention there is provided means initially secured against the aitchbone of a whole animal carcass and having means for spreading in relatively opposite directions, the briskets and the backbone of the whole animal carcass to prevent muscular distortion during chilling of the carcass.

The device of the present invention is exemplified in the drawing, in which like characters of reference are used to designate similar elements.

Figure 1 is a front view of the device constructed in accordance with the present invention.

Figure 2 is a side view of the device shown in Figure 1.

Figure 3 is a front view of a suspended animal carcass showing the manner of using the device of the present invention therewith.

Figure 4 is a side view of the carcass shown in Figure 3.

In accordance with the present invention, freshly killed carcass 1, while still in a warm condition, may be suitably suspended from suspension means 2 for the application of the device shown in Figures 1 and 2.

The device comprises elongated rod member 3 provided at one of its ends, as at 4, with outwardly diverging prongs 5, each of the prongs 5 being provided at its free end with upwardly turned hook member 6.

Laterally opposite brisket spreaders 7 are adjustably mounted for slidable longitudinal movement adjacent the opposite end 8 of rod member 3 through the medium of collar 9 and wing nut 10. Each of the spreaders 7 is provided at its free end, as at 11, with supporting members 12 provided with outwardly extending flesh engaging prongs 13.

Member 14, for supporting the backbone of carcass 1 is adjustably mounted through opening 15 provided through rod member 3 for movement from and toward rod member 3. Member 14 comprises toothed bar 16 provided with teeth 17 engageable with beveled edge 18 of opening 15. Cross member 19, provided at its ends with outwardly curved portions 20, is rigidly secured at its center to the free end, as at 21, to bar 16. Cross member 19 and outwardly curved portions 20 are made to suitably rest against the backbone of carcass 1.

In use, the device is initially secured as by prongs 5 and hooks 6 immediately beneath the aitchbone, as at 22, as shown in Figure 4. The spreaders 7 then are suitably adjusted on rod 3 so as to engage, by prongs 13, and suitably spread the briskets of the carcass, as shown at 23. Thereafter, the backbone of the carcass is suitably pressed outwardly, as at 24, by adjustment of cross member 19, which is effected by manually operating handle 25 causing ratchet bar 16 to pass through opening 15 and press member 19 against the backbone to straighten the carcass.

The freshly killed carcass with the device in, is removed to a chilling chamber following which the distended portions of the carcass remain firmly in placed position.

I claim:

1. Means adaptable to a whole carcass to prevent muscular distortion of the carcass comprising an elongated member provided at one end with hooks for securing the elongated member to the carcass at the hind end and adjacent its opposite end with laterally opposite means for spreading the brisket of the carcass, said means being shorter in length than the elongated member, and a backbone supporting member adjustably mounted through an opening provided in the elongated member for movement from and toward the elongated member in a plane substantially midway between the opposite spreading means.

2. Means adaptable to a whole carcass to prevent muscular distortion of the carcass comprising a central rod provided at one end with hooks for securing the central rod to the carcass at the hind end, laterally opposite brisket spreaders shorter in length than the central rod and adjustably mounted for slidable longitudinal movement adjacent the opposite end of the central rod, and a backbone supporting member adjustably mounted through an opening through the central rod for movement from and toward the central rod in a plane substantially midway between the two opposite spreaders.

3. Means adaptable to a whole carcass to prevent muscular distortion of the carcass comprising a central rod provided at one end with outwardly diverging prongs, each of the prongs being provided with an upwardly turned hook for securing the central rod to the carcass at the hind end, laterally opposite brisket spreaders shorter in length than the central rod and adjustably mounted for slidable longitudinal movement adjacent the opposite end of the central rod, each of the spreaders being provided at its end with flesh engaging prongs, and a backbone supporting member adjustably mounted through an opening provided through the central rod for movement from and toward the central rod in a plane substantially midway between the two opposite spreaders.

4. Means adaptable to a whole carcass to prevent muscular distortion of the carcass comprising a central rod provided at one end with outwardly diverging prongs, each of the prongs being provided with an upwardly turned hook for securing the central rod to the carcass at the hind end, laterally opposite brisket spreaders shorter in length than the central rod and adjustably mounted for slidable longitudinal movement adjacent the opposite end of the central rod, each of the spreaders being provided at its end with flesh engaging prongs, and a backbone supporting member adjustably mounted through an opening provided through the central rod for movement from and toward the central rod in a plane substantially midway between the two spreading means, the supporting member being positioned intermediate the securing hooks and the laterally opposite spreaders.

5. Means adaptable to a whole animal carcass to prevent muscular distortion of the carcass comprising a central rod provided at one end with outwardly diverging prongs, each of the prongs being provided with an upwardly turned securing hook, a pair of laterally opposite spreaders adjustably mounted on the central rod for slidable longitudinal movement adjacent its opposite end, a supporting plate provided with outwardly extending prongs rigidly secured at the free end of each of the spreaders, and a supporting means adjustably mounted for movement from and toward the central rod through an opening through the central rod intermediate the securing hooks and the lateral spreaders, the supporting means comprising a toothed member engageable through the opening and a cross member rigidly secured at one free end of the toothed member.

6. An apparatus for preventing muscular distortion of a whole carcass comprising in combination an elongated member provided at one end with means for securing the elongated member to the carcass at the hind end and adjacent the other end with laterally opposite brisket spreaders shorter in length than the elongated member, and a backbone supporting member adjustably mounted for movement from and toward the elongated member in a plane substantially midway between the opposite spreaders.

LEONARD DE MOSS.